United States Patent [19]

Hamman

[11] Patent Number: 4,634,337
[45] Date of Patent: Jan. 6, 1987

[54] INTEGRATED WHEEL LIFT WRECKER
[75] Inventor: Reed K. Hamman, Newbern, Tenn.
[73] Assignee: Dover Corporation, Chattanooga, Tenn.
[21] Appl. No.: 690,308
[22] Filed: Jan. 10, 1985
[51] Int. Cl.[4] .................................................. B60P 3/12
[52] U.S. Cl. ..................................... 414/563; 280/402; 212/264; 414/718
[58] Field of Search ............... 414/589, 590, 718, 592, 414/563; 280/402; 212/255, 256, 264, 231, 227

[56] References Cited

U.S. PATENT DOCUMENTS

| | | | |
|---|---|---|---|
| 3,434,607 | 3/1969 | Nelson | 414/563 |
| 4,000,823 | 1/1977 | Aquila | 414/563 |
| 4,142,308 | 3/1979 | Brandtjen | 414/718 X |
| 4,382,743 | 5/1983 | Newell | 414/718 X |
| 4,473,237 | 9/1984 | Lind | 414/563 X |
| 4,473,334 | 9/1984 | Brown | 414/563 |
| 4,534,579 | 8/1985 | Shackelford, Sr. | 414/563 X |

FOREIGN PATENT DOCUMENTS

| | | | |
|---|---|---|---|
| 986155 | 3/1976 | Canada | 280/402 |
| 2821436 | 11/1979 | Fed. Rep. of Germany | 414/563 |

Primary Examiner—Frank E. Werner
Attorney, Agent, or Firm—Alan Ruderman

[57] ABSTRACT

Towing apparatus mounted on the rear of a towing vehicle for lifting and towing a disabled vehicle by its wheels has a lifting boom housing for telescopically carrying an extendible boom on which wheel engaging forks are supported. The lifting boom housing disposition is controlled by two hydraulic cylinders. One cylinder is fixed at one end and pivotably connected to the lifting boom housing at the other end which is also attached to and constrained by slidable guide members mounted in slideways for movement in an inclined linear path downwardly and rearwardly relative to the towing vehicle. The other cylinder is pivotably connected to the boom housing and to the guide members for controlling the attitude of the boom housing relative to the roadway. Additionally the wheel engaging forks have a tubular square cross sectional configuration telescopically mountable on a tow bar having a similar configuration so that the forks may be disengaged from the tow bar and disposed at 90° or 180° dispositions from the operative position. The tow bar is mounted for rotational movement about a vertical axis and may also be mounted about a horizontal axis extending axially relative to the boom housing.

15 Claims, 3 Drawing Figures

INTEGRATED WHEEL LIFT WRECKER

BACKGROUND OF THE INVENTION

This invention relates to vehicle lifting and towing apparatus and more particularly to apparatus of this type integrated into the bed of a towing vehicle and having a boom elevationally extendible at an incline and angularly adjustable for permitting attitude control of the boom regardless of its elevation.

Recent developments in the art of lifting and towing disabled vehicles by a towing vehicle have resulted in wheel lift devices which engage and lift the front or rear wheels of the disabled vehicle. Most of these known devices are of the type which may be attached to the rear of a towing vehicle and utilized in conjunction with conventional wrecker apparatus. As illustrated in Cannon, et al U.S. Pat. No. 4,451,193 assigned to the common assignee of the present invention, these devices are used in conjunction with the wrecker boom and winching apparatus. Another example of this type of device appears to be illustrated in Peterson U.S. Pat. No. 4,384,817. It is, however, desirable to combine the features of a wrecker and a wheel lift device. Examples of this are illustrated in Brown U.S. Pat. No. 4,473,334; Lind U.S. Pat. No. 4,473,237; Pigeon U.S. Pat. No. 3,924,763; German Auslegeschrift No. 26,08,523; and German Offenlegungsschraft No. 28,21,436.

An important criteria of such devices is that the wheel engaging apparatus be stored within the bed of the towing vehicle or as close to the tail board thereof as possible when the device is in the storage position.

The known current wheel lifts have a horizontally telescoping boom which either pivots about a stationary frame member or is attached to a parallelogram linkage which pivots about a stationary frame member. Another known method of boom control is to attach rollers to the boom and move it vertically and rearwardly on a track.

The ideal wheel lift is one in which minimum extension occurs so that in the storage condition the apparatus does not encumber the bed, thereby permitting recovery apparatus to be utilized on the same vehicle if desired. Additionally, the apparatus should be capable of retracting a towed vehicle closely to the tailboard to provide a weight distribution on the towing vehicle which overcomes the tendency of the front wheels lifting. Moreover, the ideal wheel lift apparatus should have a wheel engaging frame or carriage which can follow the contour of the road-bed even when on a slope, and permit the wheel engaging elements to dig in and get under the wheels of the vehicle to be towed even when, for example, there is snow on the road. Furthermore, such apparatus should provide sufficient ground clearance between the towed vehicle even when a low slung vehicle is towed.

SUMMARY OF THE INVENTION

Consequently, it is a primary object of the present invention to provide an intregral wheel lift apparatus that has minimum boom extension and permits the boom attitude to be controlled so that minimum extension beyond the tailboard occurs in storage, that a towed vehicle may be drawn closer to the towing vehicle, and that the attitude of the towing boom may be adjusted relative to the ground regardless of the elevation of the boom.

It is another object of the present invention to provide a wheel lifting apparatus integrated with a towing vehicle, the apparatus having a boom housing including a pivotal support controllably moveable along a linear path inclined relative to the roadway, and an attitude control for varying the disposition of the boom housing about the pivotal support, the boom housing telescopically carrying the lifting booms on the end of which the vehicle lifting carriage is carried.

Accordingly, the present invention provides apparatus carried by a towing vehicle for lifting and towing a disabled vehicle by its wheels, the apparatus including a lifting boom housing for telescopically carrying the lifting boom and which has a pivotal support controllably moveable along an inclined linear path, the boom housing being angularly adjustable about the pivotal support. The pivotal support of the boom housing is carried by a power extension member such as the end of an output piston rod of a hydraulic cylinder and the rod is constrained for movement only along a fixed linear path. Another power extension member also preferably a hydraulic piston/cylinder has one end pivotably constrained to move in a fixed linear path and the other end pivotably connected to the boom housing spaced from the pivotal support of the boom housing for varying the attitude thereof.

In carrying out the invention both linear path constraints are provided by at least one and preferably two inclined slide members telescopically received within corresponding slideways fixed to the frame of the vehicle, the boom housing pivotal support and the attitude control member both being pivotably carried by the slides. The slideways are inclined in a rearwardly and downwardly direction so that the slide members, together with the boom housing, move rearwardly and downwardly when a vehicle is to be loaded, and retract forwardly and upwardly for lifting and towing. The attitude control acts to vary the inclination of the boom relative to the roadway regardless of the elevation of the boom. By moving the boom on an incline a minimum extension of the boom is permitted. The control of the attitude of the boom permits the towed vehicle to be lifted higher and closer to the towing vehicle for better weight distribution on the axles of the towing vehicle. Moreover, the attitude control permits the wheel engaging carriage forks to follow the contour of the road and to dig in under the tires of the disabled vehicle on snow etc., and permits substantial and immediate clearance between the ground and the towed vehicle.

Another aspect of the present invention is the provision of mounting the wheel engaging forks such that they may be changed from a positively locked operative position to a positively locked stored position in a plane 90° or even 180° from the operative position. Moreover, another aspect of the present invention is the provision of a towing carriage swivel mount which permits the carriage to follow the contour of the roadway for engaging a towed vehicle and for permitting the vehicle to follow the road contour when it is being towed independent of the contour of the road directly under the towing vehicle.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
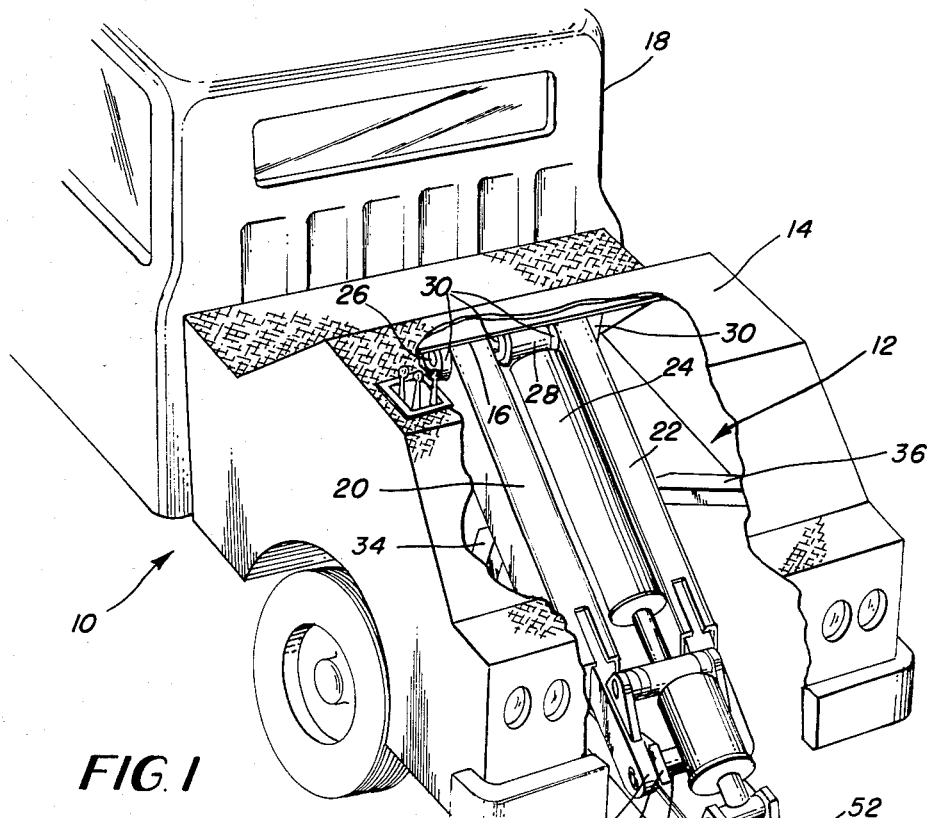
FIG. 1 is a rear perspective view of a towing vehicle having wheel lifting apparatus constructed in accordance with the principles of the present invention with portions of the vehicle broken away for clarity of presentation and illustrates the boom housing partly extended.
Figure 2:
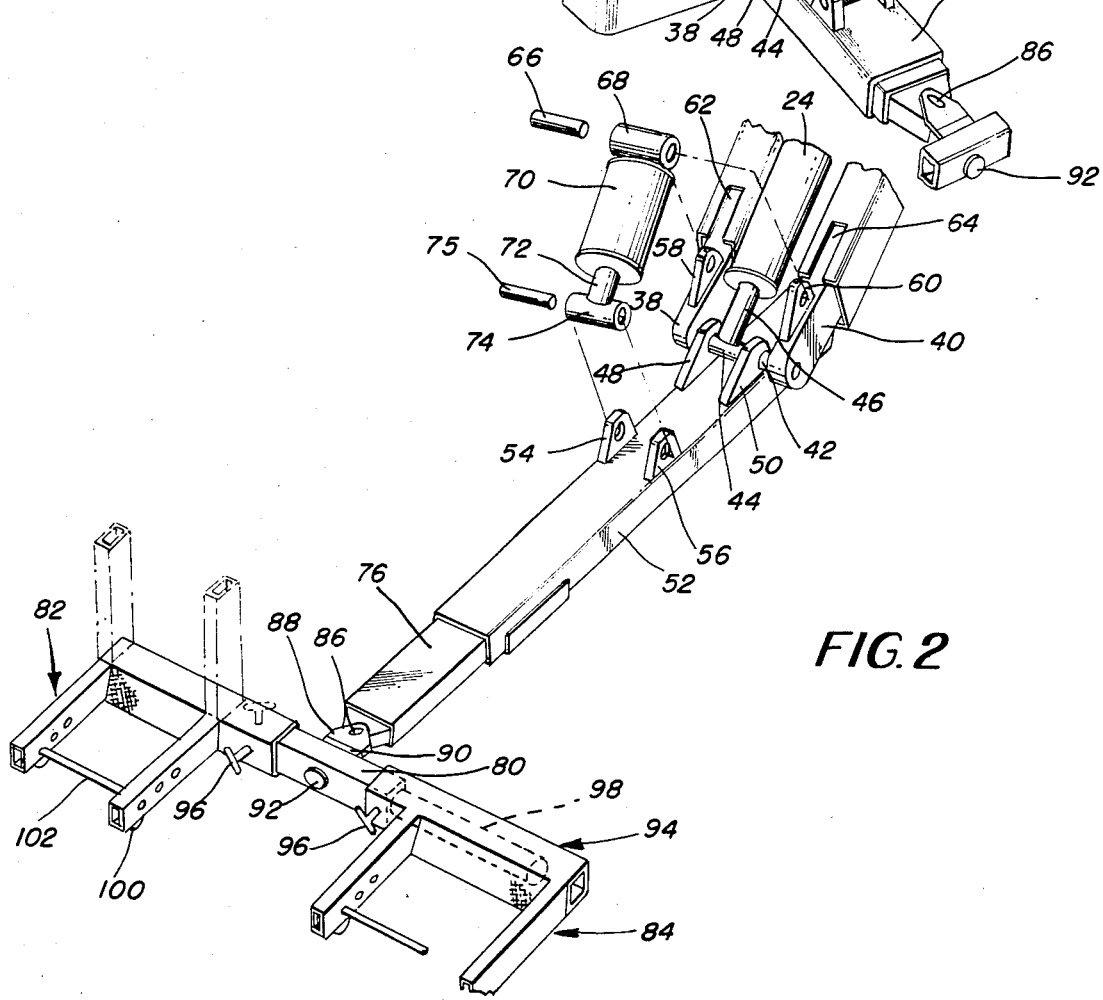
FIG. 2 is a fragmentary perspective view of a portion of the wheel lifting apparatus with the inner lifting boom partly extended, with portions thereof partly disassembled and illustrating two positions of the wheel engaging forks.
Figure 3:
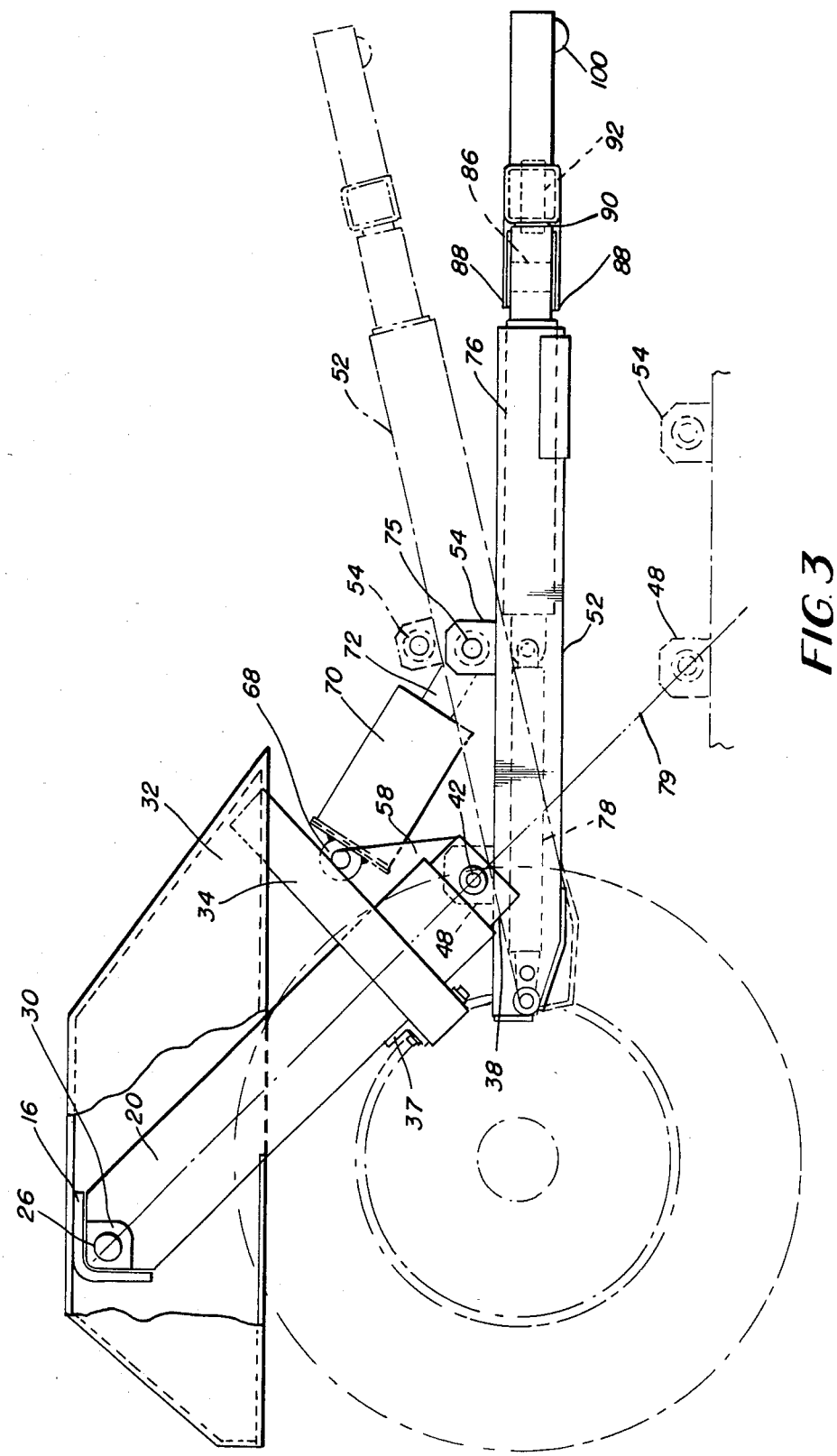
FIG. 3 is a side elevational view of the lifting apparatus illustrating two elevational positions of the boom and a horizontal and an upward inclination thereof.

Referring to the drawings a towing vehicle 10 is illustrated having wheel lifting apparatus 12 constructed in accordance with the present invention. The vehicle 10 includes a bed 14 having a structural support member 16 disposed rearwardly of the cab 18 and extending across the bed. Secured to the support member 16 and extending rearwardly are a pair of tubular slideways 20, 22. Disposed intermediate the slideways 10, 22 is the tail end of a hydraulic cylinder 24. Preferably the slideways 20, 22 and the cylinder 24 are fastened to the support member 16 by means of a transverse rod 26 extending through the slide members and through a cylindrical spool 28 secured at the end of the cylinder and through ears 30 secured as by welding to the support member 16. The ears 30 are disposed at opposite ends of the slideways and also intermediate each slideway and the cylinder. Thus, the upper ends of the slideways 20, 22 and the upper end of the cylinder 24 are stationary relative to the bed of the vehicle.

The slideways 20, 22 are hollow members which in the preferred embodiment have a rectangular cross sectional configuration, although it should be understood that any other convenient cross sectional configuration may be utilized in accordance with the invention. Secured to the frame 32 of the bed 14 at opposite sides of the slideways is a respective beam 34, 36 each of which extends downwardly from the frame 32 and is secured to a transversely extending cross member or brace 37 by conventional securing means. The cross beam 37 is disposed at an elevation below the stationary upper ends of the slideways and the slideways are inclined downwardly and are supported on the cross beam and secured thereto by means of welding or the like. Consequently, the slideways are at a fixed inclination relative to the bed and to the roadway, the angle of inclination of the slideways preferably being in the range of approximately 45° and in a prototype model is approximately 43°.

Telescopically received within each slideway 20, 22 is a respective slide member 38, 40 of the same cross sectional configuration as the slideways. The free end of each slide member 38, 40 has an aperture for receiving a pin 42 which extends therebetween. Journally carried on the pin 42 in the central portion thereof is the rod eye 44 at the end of the piston rod 46 of the hydraulic cylinder 24, the rod eye being in the form of a cylindrical spool. Also journally carried by the pin 42 on opposite sides of the rod eye spool are a pair of upstanding ears 48, 50 which are fixed to the upper surface of a hollow lifting boom housing 52 preferably by welding. Thus, the lifting boom housing 52 is pivotally carried by the slide members 38, 40 and piston rod 46 and moveable therewith, the piston rod 46 and the pin 42 on which the lifting boom housing is carried being constrained to move in a linear path as determined by the slideways 20, 22. Spaced rearwardly from the ears 48, 50 on opposite sides of the boom housing 52 is another pair of upstanding ears 54, 56 for purposes hereinafter explained.

Upstanding from the upper surface of the slide members 38, 40 spaced a short distance from the free ends thereof is a respective ear 58, 60. Preferably the slideways 20, 22 are relieved at the upper surfaces at 62, 64 so that the ears 58, 60 may protrude through the slideways thereby permitting the ears to be disposed in spaced relationship from the ends of the slide members while permitting the slide members to be fully supported within the slideways when they are retracted therein and to provide additional support by the slideways for the slide members when extended. Pivotably disposed on a journal pin 66 between the ears 58, 60 is a hollow spoool 68 which is welded on the tail end of another hydraulic cylinder 70 having its piston rod 72 extending rearwardly and fastened to a cyclindrical rod eye spool member 74. A pin 75 journally mounts the rod eye member 74 and thus the rod 72 between the rear ears 54, 56 on the lifting boom housing 52. Consequently, since the cylinder 70 is mounted for movement with the slide members 38, 40 that end of the cylinder is constrained to move in a linear path parallel to the path of the boom housing support pin 42. It can thus be seen that actuation of the rod 72 of the cylinder 70 acts through the pin 75 to pivot the boom housing 52 about the pivotal support of the pin 42 to thereby change the attitude of the boom housing independently of the extension of the cylinder 24.

Disposed within the boom housing 52 for telescopic movement relative thereto is one or more inner or lifting booms 76. Conventionally the inner boom is extended relative to the boom housing 52 by means of a hydraulic cylinder 78 mounted within the boom housing 52 and having one end pivotably fastened adjacent the cab end thereof and having its rod end pivotably fastened to the end of the inner boom 76. If additional inner lifting booms are utilized they too would be telescopically extended and retracted by means of hydraulic cylinders in a similar manner.

The cylinder 24 defined as the "control cylinder" controls the extended position of the boom housing and the inner boom along the linear path defined by the center line 79 of the rod 46. Moreover, since the end of the cylinder 70 defined as the "attitude cylinder" moves together with the slide members 38, 40, at any extended position of the attitude cylinder rod 72, the boom housing 52 and inner boom 76 merely move rearwardly and downwardly or forwardly and upwardly at an inclined path defined by the inclination of the slideways 20, 22. To change the attitude of the boom housing and the inner boom relative to the roadway, the rod 72 of the attitude cylinder 70 is either extended or retracted, extension effecting a downward pivoting of the boom housing and inner boom about the pivot pin 42, and retraction effecting an upward pivoting of the boom housing.

Mounted at the free end of the inner boom is the tow bar 80 which carries the disabled vehicle wheel engaging carriage forks 82, 84. The tow bar 80 comprises an elongated member which conventionally is pivotably mounted for rotation about a generally vertical axis defined by a journal pin 86 extending through a bifurcated connecting member 88 which connects the tow bar to the end of the inner boom 76. Moreover, to permit the carriage to follow the contour of the ground for engaging the wheels of a disabled vehicle, and to permit the disabled vehicle to follow the contour of the roadway under the towed vehicle independently of the contour of the roadway under the towing vehicle, the carriage may also be mounted for pivotal movement about a horizontal axis extending along the axial direction of the inner boom and boom housing. To this end the connecting member 88 which carries the journal pin 86 may have a plate 90 fastened to or formed together therewith, the plate 90 having a journal pin 92 extending through the plate along the direction of the elongated axis of the inner boom 76 and boom housing 52 and pivotably carries the tow bar 80. Thus, not only may the tow bar and carriage forks pivot about the vertical axis of the pin 86, but they may also pivot about the horizontal axis of the pin 92. Moreover, with this construction when a disabled vehicle is towed around a corner or the like the tow bar may pivot about both axes which tends to aid in maintaining clearance between the towed vehicle and the tailboard of the towing vehicle even when the towed vehicle is drawn closely adjacent the towing vehicle by means of the retraction of the control cylinder 24 and the inner boom extension cylinder 78.

Another feature of the present invention is the provision of changing the disposition of the wheel carriage forks from the operative disposition where they can independently straddle the front or rear wheels of the disabled vehicle to an inoperative position disposed either 90° or 180° removed from the operative position while yet maintaining a secure structure when in the operative position. Thus, the tow bar 80, as illustrated, has a substantially square cross sectional configuration and each fork carriage frame 94 has a cooperating tubular member having a square shaped configuration adapted to telescopically receive the tow bar at one end. A spring biased locking pin 96 may pass through one or more selective holes in the frame 94 and tow bar 80 to maintain the desired spacing between the forks for vehicles of various wheel axle widths. When the forks are to be placed in the storage position they may be disassembled from the tow bar and reasssembled in either a 90° or, if desired, a 180° disposition from the operative position. To aid in changing positions without removing the frames 94 from the tow bar, the ends of the tow bar may have cylindrical members 98 secured thereon so that frames may be pulled free from the square section of the tow bar onto the respective cylindrical portion and then rotated to the desired position and again replaced onto the square portion of the tow bar.

In use the forks are disposed in straddling relationship about respective transverse wheels of the disabled vehicle in conventional manner. This may be aided by rollers 100 at the lower ends of the forks. Wheel retaining rods 102 are then inserted between the respective fork tines of each fork at the rear of each wheel for cradling each wheel in the carriage provided by the fork and rod 102.

In operation when a disabled vehicle is to be hoisted and towed the towing vehicle is moved adjacent the front or rear of the disabled vehicle and the cylinder 24 is extended to extend the outer boom housing 52. Depending on the angular disposition of the roadway on which the disabled vehicle is supported the attitude cylinder 70 may be actuated to incline the outer boom housing 52 to the desired inclined disposition. For example, if the disabled vehicle is sitting on snow this ability to place the outer boom housing at a downward inclination would be exceptionally helpful in digging the forks into the snow beneath the wheels of the disabled vehicle. After the outer boom housing has been disposed at the desired location, the inner boom extension cylinder 78 may be acutated to bring the forks in the proper disposition relative to the wheels to be lifted. After the vehicles are properly locked into the cradle between the forks, and tied down by a tie-down harness (not illustrated) the control cylinder 24 and/or the attitude cylinder 70 would then be retracted to raise the outer boom. The inner boom 76 would thereafter be retracted and the outer boom housing then raised to the proper disposition and inclination for towing, which would vary depending upon the vehicle being towed. When the appartus is in the inoperative position the control cylinder 24 is fully retracted which draws the outer boom housing forwardly and upwardly relative to the cab 18 of the towing vehicle. The fork carriage frames 94 would then be in the 90° (or 180°) rotated position adjacent the tailboard of the towing vehicle or flipped over onto the bed of the towing vehicle for such vehicles which may have substantial flat upper surfaces adjacent the tailboard.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Towing apparatus mounted in the bed at the rear of a towing vehicle for lifting and towing a disabled vehicle, said bed being fixedly secured on said towing vehicle at a fixed angular disposition, said apparatus comprising an elongated lifting boom housing, said lifting boom housing carrying extendible lifting means adapted to be placed beneath the disabled vehicle for operatively engaging the disabled vehicle, first power means having a casing and a moveable member extendible and retractable linearly relative to said casing, means for securing one of said casing and said moveable member to said towing vehicle, journal means for pivotably attaching the other of said casing and said moveable member to said lifting boom housing at a pivotal support, guide means supported beneath the bed for constraining said pivotal support for movement in a fixed linear path angularly inclined rearwardly and downwardly relative to said bed and said towing vehicle upon extension and retraction of said moveable member, second power means having a casing and a moveable member extendible and retractable relative to said casing, connecting means for pivotably attaching one of said second power means casing and said second power means moveable member to said guide means, and means for pivotably attaching the other of said second power means casing and said second power means moveable member to said lifting boom housing at a disposition spaced longitudinally from said pivotal support for pivoting the boom housing about said pivotal support upon extension and retraction of said power means moveable member.

2. Towing apparatus as recited in claim 1, wherein said guide means comprises at least one slideway, means for securing said slideway stationary relative to said vehicle, a slide member telescopically mounted within each slideway for movement relative thereto, means for pivotably mounting said journal means and pivotal support to said slide member for driving said slide member and said pivotal support upon extension and retraction of said moveable member.

3. Towing apparatus as recited in claim 2, wherein said connecting means is carried by said slide member.

4. Towing apparatus as recited in claim 3, wherein each power means comprises a hydraulic cylinder.

5. Towing apparatus as recited in claim 1, wherein said other of said second power means casing and said second power means moveable member is attached to said boom housing intermediate said pivotal support and said extendible lifting means.

6. Towing apparatus as recited in claim 1, wherein said extendible lifting means includes an elongated lifting boom telescopically receivable within said boom housing and extendible in the direction remote from the disposition of said pivotal support.

7. Towing apparatus mounted in the bed at the rear of a towing vehicle for lifting and towing a disabled vehicle, said bed being fixedly secured on said towing vehicle at a fixed angular disposition, said apparatus comprising an elongated lifting boom housing, said lifting boom housing carrying extendible lifting means adapted to be placed beneath the disabled vehicle for operatively engaging the disabled vehicle, a first hydraulic cylinder having a piston rod extending from one end thereof, means for securing another end of said cylinder to said towing vehicle, journal means for pivotably attaching said rod to said lifting boom housing at a pivotal support, at least one linearly extending slideway beneath the bed, means for securing said slideway to said towing vehicle at a fixed angular disposition inclined rearwardly and downwardly relative to said bed and said towing vehicle, a slide member telescopically disposed within said slideway, one end of said slide member being disposed for extension out the rearwardly extending end of the respective slideway, means for pivotably connecting said piston rod to said extendible end of said slide member for constraining said rod and said pivotal support for movement in a linear path determined by said slideway, a second hydraulic cylinder having a second piston rod extending from one end thereof, means for pivotably mounting one of said second rod and the other end of said second cylinder to said slide member, and means for pivotably mounting the other of said second piston rod and other end of said second cylinder to said lifting boom housing spaced from said pivotal support for pivoting the boom housing about said pivotal support upon extension and retraction of said second hydraulic cylinder piston rod.

8. Towing apparatus as recited in claim 7, wherein there are two slideways and said first hydraulic cylinder is disposed intermediate said slideways, each slideway having a respective slide member, the piston rod of said first cylinder being connected to both slide members.

9. Towing apparatus as recited in claim 8, wherein said second piston rod is connected to said lifting boom housing and said other end of said second cylinder is connected to said slide members.

10. Towing apparatus as recited in claim 9, wherein said second piston rod is connected to said lifting boom housing at a disposition intermediate said pivotal support and said extendible lifting means.

11. Towing apparatus as recited in claim 7, wherein said extendible lifting means includes an elongated lifting boom telescopically receivable within said boom housing and extendible in the direction remote from the disposition of said pivotal support.

12. Towing apparatus as recited in claim 7, wherein said means for pivotably connecting the piston rod of said first cylinder to said slide member is disposed at said pivotal support.

13. Towing apparatus as recited in claim 12, wherein there are two slideways and said first hydraulic cylinder is disposed intermediate said slideways, each slideway having a respective slide member, the piston rod of said first cylinder being connected to both slide members.

14. Towing apparatus as recited in claim 13, wherein said second piston rod is connected to said lifting boom housing and said other end of said second cylinder is connected to said slide members.

15. Towing apparatus as recited in claim 14, wherein said second piston rod is connected to said lifting boom housing at a disposition intermediate said pivotal support and said extendible lifting means.

* * * * *

UNITED STATES PATENT AND TRADEMARK OFFICE
CERTIFICATE OF CORRECTION

PATENT NO. : 4,634,337

DATED : January 6, 1987

INVENTOR(S) : Reed K. Hamman

It is certified that error appears in the above-identified patent and that said Letters Patent is hereby corrected as shown below:

Column 3, line 25, please change "10" to -- 20 --

Signed and Sealed this

Seventh Day of April, 1987

*Attest:*

DONALD J. QUIGG

*Attesting Officer*     *Commissioner of Patents and Trademarks*